United States Patent Office 3,529,710
Patented Sept. 22, 1970

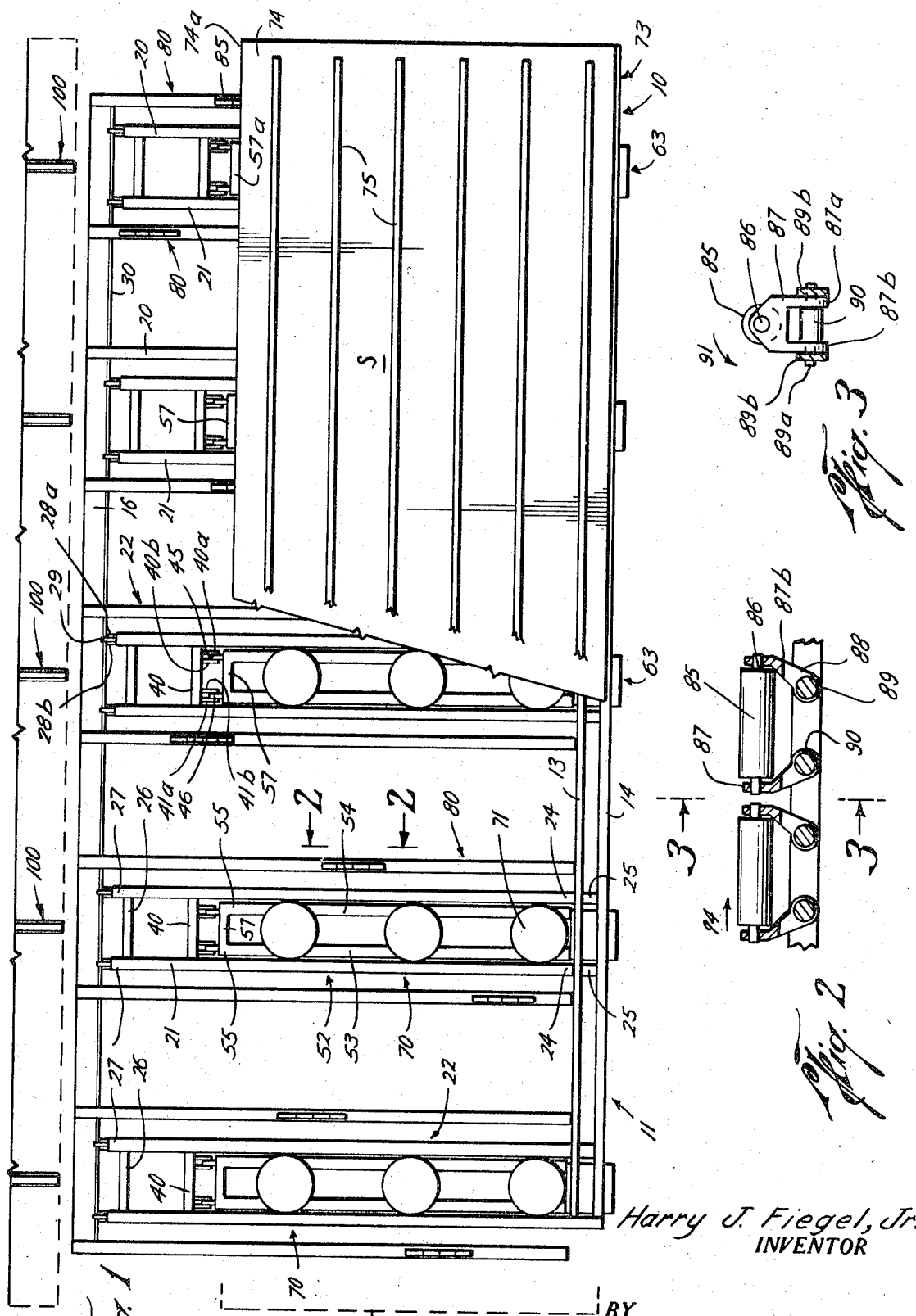

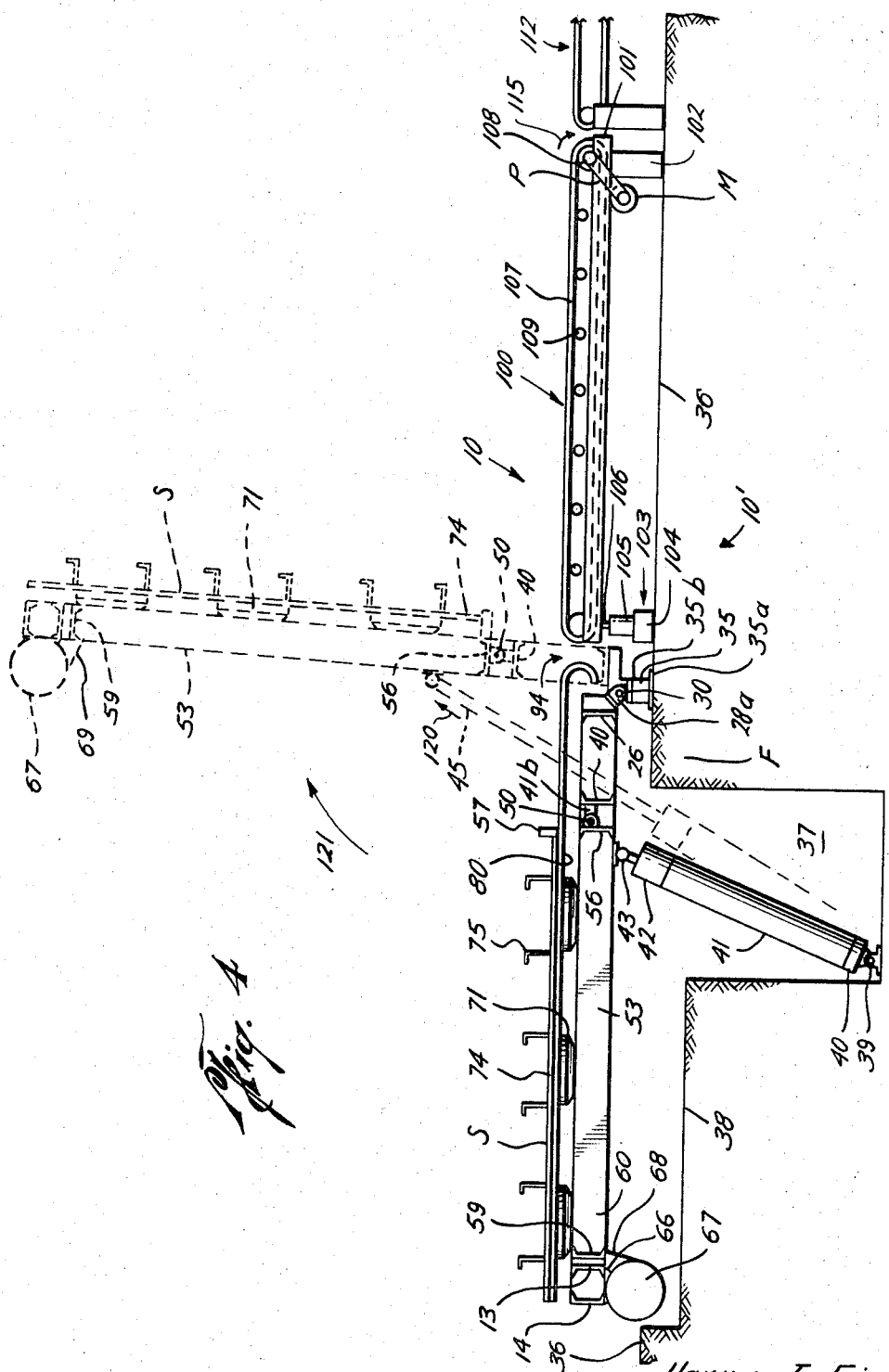

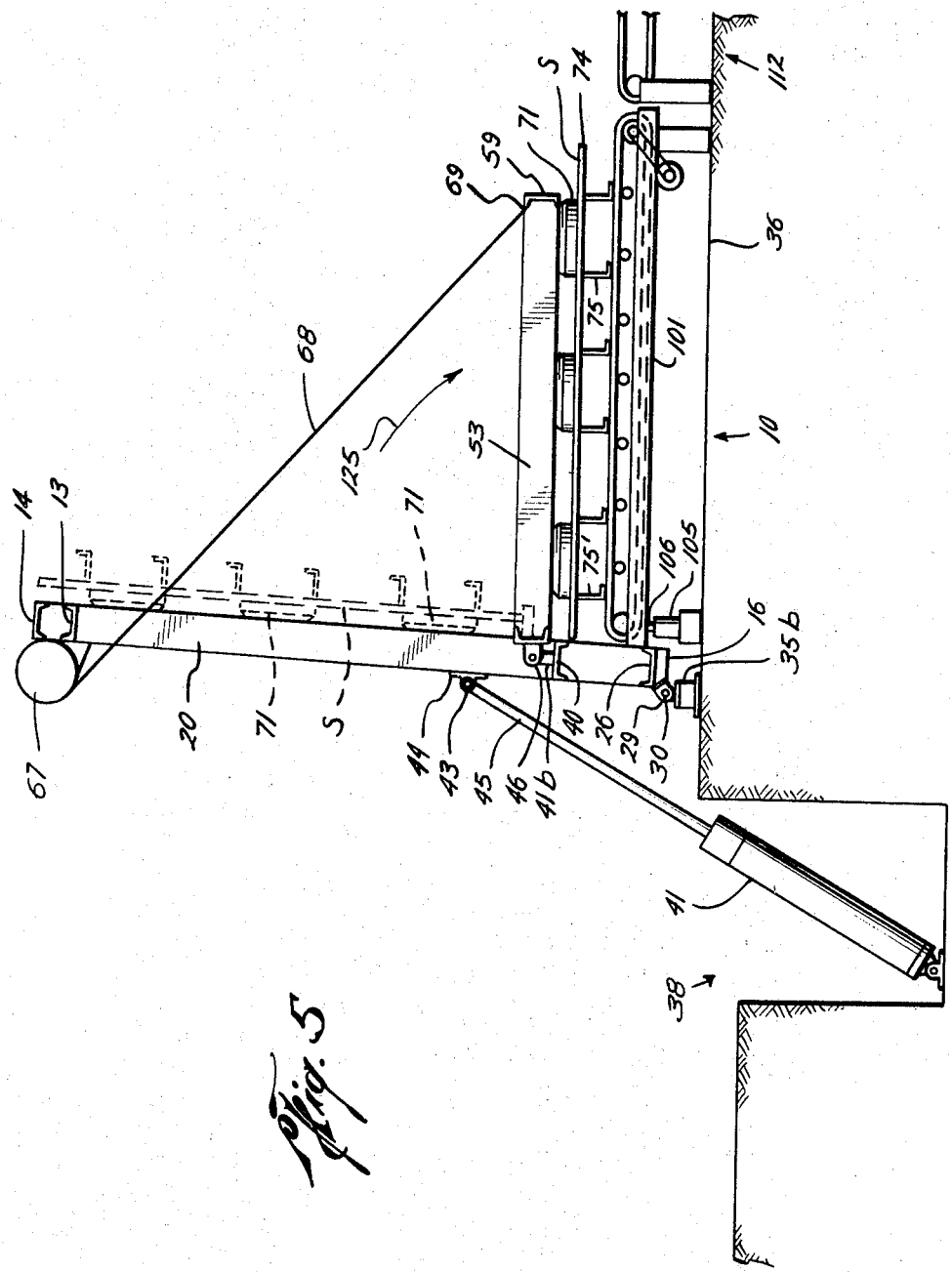

---

3,529,710
APPARATUS FOR OVERTURNING AND/OR TRANSVERSELY CONVEYING STRUCTURAL SHAPES
Harry J. Fiegel, Jr., Galveston, Tex., assignor to Kelso Marine, Inc., a corporation of Texas
Filed Sept. 26, 1968, Ser. No. 762,744
Int. Cl. B65g 47/24
U.S. Cl. 198—33                    7 Claims

ABSTRACT OF THE DISCLOSURE

A panel is moved by a conveyor onto a plurality of panel holder arms by a plurality of rollers adapted to rotate longitudinally relative to the panel. If it is desired to move the panel laterally, a plurality of sets of the linked rollers is simultaneously moved transversely and laterally relative to the panel to thereby move the panel off the panel holder arms. If it is desired to overturn or flip the panel, a plurality of panel holders is actuated to retain the panel in position. Thereafter, the panel holders are rotated to a vertical position and lowered in an inverted horizontal position for overturning of the panel.

BACKGROUND OF THE INVENTION

Field of the invention

This invention relates to an alternate panel overturn and/or transverse turn conveyor apparatus.

Description of the prior art

As far as applicant is aware, if it was heretofore desired to overturn or transversely move panels, structural pieces or other large, heavy shapes, it was necessary to lift such panels, pieces or shapes by hand or by utilization of cables, which lines, and the like.

Further, to move or overturn large structural shapes required expensive pieces of machinery for that purpose and experienced laborers for maintaining and operating such machinery.

The requirements of expensive machinery and experienced laborers are costly in terms of expense and can be time consuming if the structural shapes are large.

Also, it is well known that injuries are numerous when moving or overturning structural shapes due to the heavy weight and lack of maneuverability of such shapes.

SUMMARY OF THE INVENTION

Briefly the present invention relates to an apparatus for overturning and/or transversely conveying structural shapes including a support frame; means for pivoting the support frame about one side thereof; conveyor means mounted with the frame for moving the structural shape in a longitudinal direction relative to said support frame and in a lateral direction relative to the suport frame as desired; a means for releasably retaining the structural shape relative to the support frame and a means for pivoting said means for releasably retaining the structural shape relative to the support frame wherein if it is desired to move the structural shape transverse to said frame only conveyor means is actuated and wherein if it is desired to overturn the structural shape the means for releasably retaining the structural shape is actuated and the frame is pivoted arcuatedly upwardly to move the structural shape to a vertical position wherein the means for pivoting said means for releasably retaining is actuated to pivotally arcuately move the means for retaining the structural shape downwardly until such structural shape is overturned.

It is an object of the present invention to provide a new and improved apparatus for overturning and/or transversely conveying structural shapes.

Yet still another object of the present invention is to provide an apparatus including a double pivotal means for overturning and transversely conveying structural shapes.

Still yet, another object of the present invention is to provide an apparatus for conveying structural shapes transversely to such apparatus without actuation of a plural pivotal means for overturning the structural shape.

BRIEF DESCRIPTION OF THE DRAWING

FIG. 1 is a top view of the apparatus of the present invention illustrating a structural shape positioned on an upper support frame of the apparatus relative to a plurality of sets of rolling means and a plurality of sets of retaining or holding means;

FIG. 2 is a view taken along line 2—2 of FIG. 1 illustrating the relationship of two of the roller means relative to a continuous belt for moving sets of rolling means transversely relative to a support frame;

FIG. 3 is a view taken along line 3—3 of FIG. 2, partly in section, illustrating the relationship of one of the rolling means relative to a continuous conveyor means;

FIG. 4 is a side view of the apparatus of the present invention illustrating a series of sequential steps for overturning structural shapes; and FIG. 5 is also a side view further illustrating a series of sequential steps in overturning a structural shape with the apparatus of the present invention.

DESCRIPTION OF THE PREFERRED EMBODIMENT

As illustrated in FIGS. 1, 4 and 5 the apparatus for overturning and/or transversely conveying structural shapes of the present invention is generally designated by numeral 10. The apparatus includes a frame support member or support frame generally designated at 11 including a pair of parallel I beam members 13 and 14 along one side thereof and a pivotal rod 30 positioned along the other side of and parallel to the I beam members 13 and 14. A suitable support member or straight beam 16 is secured by any suitable means such as welding or the like to the pivotal rod 30 for providing added support for the frame 11. As further illustrated in FIGS. 1, 4 and 5 a plurality of set of pairs of support frame pivot arms is indicated at 20 and 21 with each of the sets of arms 20 and 21 being designated by the numeral 22. Each of the sets 22 of the arms 20 and 21 is spaced relative to each other and is positioned transversely to the parallel I beams 13 and 14. An end 24 of each of the pivot arms is secured by any suitable means such as welding to the I beam or support member 13 of the frame support or support frame 11. As illustrated in FIG. 1, a cross support member 25 is spaced between and welded to each of the I beams 13 and 14 in substantial longitudinal parallel alignment with each of the arms 20 and 21 of the sets of arms 22.

A cross member 26 is secured at each end 22 by any suitable means such as welding to the inner surface of one of each of the pivot arms 20 and 21 of each of the respective sets 22. The end 27 of each of the arms 20 and 21 is secured with a pair of suitable U-shaped brackets 28a and 28b which are spaced relative to each other to receive an outwardly extending bracket 29 between each of the outwardly extending members 28a and 28b. Each of the outwardly extending brackets 29 is secured by any suitable means such as welding to the pivot rod 30.

As illustrated in FIGS. 4 and 5, the apparatus for overturning and/or transversely conveying structural shapes 10 is positioned relative to a floor F. The floor F may be of suitable concrete, packed dirt or other construction. The pivotal end of the support frame 11, generally designated at 10', is supported by a plurality of base members 35 each of which includes a flat member 35a for preventing unnecessary tipping or tilting of the invention 10, and an upstanding leg 35b which is mounted with one of each of the pivotal brackets 29.

A normal floor level of the floor F is illustrated at 36. A pit or hole 37 in the floor F receives a means for pivoting the support frame 11 which means is illustrated as being in the form of a hydraulic means generally designated at 38. The hydraulic means 38 includes a lower mounting bracket 39 for securing one end 40 of a hydraulic cylinder 41 to the floor. The other end 42 of the hydraulic cylinder 41 is mounted pivotally by suitable pivot and bracket means 43 to a bracket plate member 44 which plate member 44 is secured to one of the centermost arms 20 or 21 of one of the sets of arms 22. However, it is of course to be understood that there may be provided a plurality of hydraulic cylinders 41 secured to each of the arms 20 and 21 of each sets of arms 22 or that there may be provided as many hydraulic cylinders 41 as needed and desired. As further illustrated in FIGS. 4 and 5 the piston arm 45 extends outwardly to the end 42 of the cylinder 41 and is secured to the bracket means 43. It is to be understood that the cylinder 41 is secured to a suitable means, such as a solenoid valve and corresponding electrical means (not shown) for actuating the piston arm 45.

The portion of the floor 38 is lower than the lever of the floor as at 36 for a purpose to be brought out hereinafter. Also it should be noted that the end of the support frame 11 adjacent the I beams 13 and 14 does not include a rest or support for such end but that one may be provided if desired.

As illustrated in FIG. 1, a plurality of cross members 40 is spaced from cross member 26 adjacent the ends 27 of each of the arms 20 and 21, respectively, and is positioned parallel to such cross member 26 and secured by any suitable means such as welding to each of the arms 20 and 21 of each of the plurality of sets of arms 22. Mounted with each of the cross or support beams 40 is a pair of U-shaped pivot members 40a, 40b and 41a, 41b, each of which comprise suitable outwardly extending tab members positioned parallel relative to each other. A pair of outwardly extending pivotal brackets 45 and 46 is received between each of the arms 40a, 40b and 41a, 41b, respectively, to enable said respective arms to be connected relative to each other with a plurality of suitable pivot pins 50 (FIG. 4).

Each of the pivotal tabs 45 and 46 is secured with a support means generally designated at 52 which support means 58 is illustrated as including a pair of parallel spaced side or arm members 53 and 54 with one pair of each of the arm members 53 and 54 illustrated as being positioned between one of each of such sets 22 of said plurality of parallel arms 20 and 21. Each of the arm members 53 and 54 is secured at one end 55 thereof with a cross beam member 56 (FIG. 4) which member 56 is secured with tabs 45 and 46. Mounted on the upper surface of the cross beam member 56 is an upwardly extending tab member 57 which member 57 may be either pivotally secured to the cross member 56 or connected to suitable electric switch means to enable said member 57 to be raised and lowered and locked in position as desired (not shown).

As illustrated in FIG. 4 the other end of the support means 52 includes a cross support bar 59 secured with each end 60 of each of the arms 53 and 54 of each of the plurality of support means 52.

As fully illustrated in FIGS. 4 and 5, a plurality of synchronized winch drums and cables generally designated at 63 is secured adjacent to one of each of the sets of a plurality of arms 22 and sets of support means 52. A suitable attaching base 66 is mounted to the lower surface of the I beams 13 and 14 to receive one of each of the winch drums 67. Of course, drums 67 are provided with suitable cable line 68 with one end 69 being secured by suitable nut and bolt or bracket means (not numbered) to the cross support member 59 of the support means 52. It is of course, to be understood that the synchronized winches designated at 63 may be electrically actuated or power driven by other suitable means (not shown) by having suitable common shafts for driving such winches (not shown).

Mounted with each of the support means 52 is a plurality of means for releasably retaining the structural shape F which means is generally designated at 70. The means 70 performs one function of holding or retaining the structural shape relative to the support means 52 when it is desired to overturn the shape S. For this purpose the holding or retaining means 70 may include vacuum means or suitable magnetic means 71 each of which is spaced relative to the support arms 53 and 54 of each of the sets 52 and each of which is mounted with such arms by any suitable means such as welding. Of course, it is to be understood that if the means or plates 71 are to be magnetically actuated that suitable electrical wiring and the like is required (not shown) and, it is similarly to be understood that if it is desired to enable such means 71 to be vacuum actuated a suitable vacuum pump and tubing are required for connection to each of the means 71 (not shown).

Generally it is contemplated that the structural shape S will be moved by a suitable conveyor means (not shown) in the direction of the arrow 73 onto the support frame 11. The structural shapes will be transferred from a shape fitting table which welds angle pieces onto surfaces of the shapes. In the embodiment illustrated in the present application the structural shape S is illustrated as including a flat panel 74 having a plurality of structural pieces 75 welded thereon. Further, in the embodiment illustrated, the structural shapes S leave the panel fitting table such that the flat side of the panel 74 is facing downwardly. As the structural shape S approaches the apparatus 10 of the present invention, it contacts a plurality of sets of spaced rollers generally designated at 80.

As illustrated in FIG. 1, one of each of a pair of the rollers 80 is positioned on each side of the pair of arms 20 and 21 of the sets of arms 22. Each of the sets of rollers 80 includes a plurality of rolling means 85 positioned parallel to the arms 20 and 21. Each of the rollers 85 is provided with a longitudinal opening (not numbered) through the center thereof for receiving a shaft 86. Each end of the shaft 86 is mounted with a corresponding hold member 87 with each of the hold members 87 being secured at the other end 88 thereof by any suitable means such as nut and bolt means 89 to a continuous conveyor belt 90.

As illustrated in FIG. 3, each of the members 87 includes a pair of parallel depending arms 87a and 87b for receiving a common bolt 89a which extends through the arms 87a and 87b and the conveyor belt 90. A plurality of nut means 89b is suitably secured with each end of the bolt means 89a to secure the arms 87a and 87b with the conveyor means 90.

The roller means 85 is adapted to rotate in the direction of the arrow 91 when contacted by the panel 94 for moving the structural panel in position on the frame support 11 as illustrated in FIG. 1. As further illustrated in FIG. 1, the leading edge 74a of the panel 74 abuts the edge 57a of the upstanding tab members 57 to prevent the structural shape S from being positioned over the pivotal means described hereinabove.

Each of the sets of roller means 80 is adapted to be power driven and rotated continuously in the direction of the arrow 94 by the continuous conveyor means 90. Of course, such conveyor means 90 is driven by a suitable motor, shafts and pulley belt (not shown) which are well known and common in the art.

As illustrated in FIGS. 4 and 5 an adjacent conveyor stand 100 is provided and includes a suitable support member 101 secured at one end with a fixed base member 102 extending upwardly for support from the floor level 36. The stand 100 includes a fixed block member 104, and a suitable hydraulically or electrically actuated cylinder 105 containing a piston (not shown) with a suitable piston arm 106 extending outwardly therefrom. The piston arm 106 is mounted with the end of the support frame 101 adjacent the pivotal end of the support frame 11. A suitable continuous conveyor belt 107 is driven by a motor means M secured with a pulley belt P which belt P is mounted with a suitable shaft and gear means 108. The gear means 108 is mounted with the continuous belt 107 for power driven rotation thereof. Suitable transverse rollers 109 are provided for supporting the continuous rotatable belt 107.

As further partially illustrated in FIGS. 4 and 5, the adjacent conveyor stand 100 is positioned adjacent another conveyor system generally designated at 112 for conveying the structural shape as desired.

In operation of the invention, a suitable structural shape is conveyed in the direction of the arrow 73 onto the support frame 11. As the structural shape contacts the first set of rollers 85 mounted with the sets of roller means 80 each of the rollers 85 rolls in the direction of the arrow 91 (FIG. 3) to enable the structural shape to be rolled into the support frame 11.

If it is desired to convey the structural shape S transversely without overturning such shape, the electrical, hydraulic or other actuating means (not shown) connected with the plurality of upstanding tab members 57 is actuated to lower such tab members to the level of the arms 53 and 54. Thereafter, each of the sets of rolling means 80 is actuated by driving the continuous conveyor 90 (FIG. 3) which moves the sets of rolling means 80 in the direction of the arrow 94 (FIG. 4) with the suitable power means (not shown). As the sets of rolling means 80 are moved in the direction of the arrow 94 the structural shape S is also moved in such direction onto the top of the rotating conveyor means 107 which is rotating in the direction of the arrow 115 to thereby move such structural shapes S transversely to the apparatus 10 of the present invention. Thereafter such shape S is moved onto the next adjacent conveyor stand 112 for further refining operations or other operations as desired.

If it is desired to overturn the structural shape S of the present invention, and as illustrated in FIG. 4, the means for pivoting the support frame or hydraulic means 38 is actuated such that the piston arm 45 moves outwardly in the direction of the arrow 120 to arcuately pivot the support frame 11 in the direction of the arrow 121 with the support bar 16, and brackets 28a and 28b pivoting about the stationery pivot pin 30. In the preferred operation, the support frame 11 and the remainder of the elements of the invention 10 of the present invention are pivoted to a position of about 94 degrees relative to the horizontal level of the floor 36.

Before the support frame 11 is pivoted, however, the holding or retaining means 71 are actuated to retain and hold the structural shape S relative to the plurality of the arms 53 and 54 to prevent the structural shape S from falling from the support frame 11 as the support frame 11 is moved to the upper position as illustrated in FIGS. 4 and 5. As set forth hereinabove, the plurality of holding means 71 may be of the actual magnetic type or the vacuum type as desired. It should also be noted that when it is desired to overturn the structural shape S that the tab member 57 is maintained in its upper position such that the edge 74a of the structural shape S or panel 74 contacts the tab member 57 to enable member 57 to support and hold the shape S in an upward vertical position. Also, is should be apparent that when it is desired to overturn the structural shape S, the conveyor means 90 of the plurality of sets of rolling means 80 is not actuated.

After the support frame 11 has been arcuately moved to the position illustrated in FIGS. 4 and 5, the synchronized winch drums 67 are actuated to release the winch lines 68. Releasing of the winch lines 68, with the end of the winch line 69 being secured with the cross members 59 of each of the support members 52 enables each of the support members 52 to pivot about the pivot pins 50 with the holding means 71, and arms 53 and 54 pivoting arcuately downwardly in the direction of the arrow 125 (FIG. 5). The cable 68 is released from the drum 67 until the structural shape S, or in the embodiment illustrated in FIG. 5, the angle pieces 75 contact the upper surface of the continuous conveyor means 107.

If the portion of the structural shape S or the angle lines 75' adjacent the pivotal end of the apparatus 10 does not touch the conveyor means, the cylinder 105 may be actuated to move the piston arm 106 upwardly or downwardly to adjust the end of the base 101 until the structural shape S is substantially contacting the continuous conveyor belt 107.

The holding means 71 is then de-energized to release the structural shape S and the synchronized winches are actuated to lift the support members 52 arcuately upwardly in the opposite direction of the arrow 123 until the winch lines 68 have been returned to their original position. Thereafter, the hydraulic means 41 is actuated to lower the pivotal support frame 11 and the other elements on the apparatus 10 to their original position as illustrated in FIGS. 1 and 4.

Without departing from the scope of the invention, it is to be understood that the structural shapes S of the present invention may include various structural and non-ordinary shapes or various pieces secured or otherwise mounted with each other.

I claim:
1. In an apparatus for overturning and/or transversely conveying structural shapes comprising:
 (a) a support frame;
 (b) means for pivoting said support frame about one side of said frame;
 (c) conveyor means mounted with said frame, said conveyor means being adapted to move the structural shapes in a longitudinal direction relative to said support frame and a lateral direction relative to said support frame, as desired;
 (d) means for releasably retaining the structural shape relative to said support frame; and
 (e) means for pivoting said means for releasably retaining the structural shape relative to said pivotal support frame wherein if it is desired to move the structural shape transverse to said frame said conveyor means only is actuated without actuation of each of said means for pivoting and wherein if it is desired to overturn the structural shape and move the structural shape transversely, said means for releasably retaining the shape is actuated and said frame is pivoted arcuately upwardly to move the structural shape to a vertical position wherein said means for pivoting said means for releasably retaining is actuated to pivotally arcuately move the means for retaining and the sturctural shape downwardly until such shape is overturned and has been moved transversely relative to said frame.
2. The structure as set forth in claim 1 wherein said conveyor means moves the structural shape longitudinally relative to said support frame and thereafter moves the structural shape laterally relative to said support frame.
3. The structure as set forth in claim 1 wherein said conveyor means includes:
 (a) a plurality of sets of roller means, each of said sets including a plurality of roller means positioned transversely relative to the sides of said frame wherein the structural shape positioned on said roller means is permitted to move longitudinally relative to said support frame;
(b) means for continuously conveying each of said sets of roller means transversely to said support frame wherein the structural shape is moved laterally relative to said support frame and is thereby removed from said frame by the lateral continuous rotational movement of each of said sets of said roller means.

4. The structure as set forth in claim 1 wherein said means for pivoting said support frame about one side includes:
(a) stationary base means;
(b) pivotal pin means securing said base means with the side of said support means; and
(c) means for arcuately lifting said support frame about said base means to a vertical position and for returning said support means to its original horizontal position.

5. The structure as set forth in claim 1 wherein said means for releasably retaining the structural shape relative to said frame and said means for pivoting said means for releasably retaining includes:
(a) holding means for releasably securing the structural shape;
(b) means for actuating said holding means;
(c) support means having two ends, said support means supporting said holding means relative to said frame;
(d) said support means being pivotally secured at one end thereof with said frame adjacent said means for pivoting said support frame;
(e) means for releasing and returning the other end of said support means secured with said frame wherein if it is desired to overturn the structural shape said holding means is actuated to hold the shape and said support frame is rotated upwardly to a vertical position with said holding means retaining the structural shape and wherein the means for releasing and returning the other end of said support means is actuated to pivot and arcuately lower said holding means and support means relative to said frame which thereby overturns the structural shape and the shape is thereafter moved transversely.

6. The structure as set forth in claim 5 wherein said holding means releases the structural shape after it has been overturned and moved and said holding means and support means are pivotally returned to their original position relative to said frame and wherein said frame is thereafter pivoted and returned to its original horizontal position.

7. The structure as set forth in claim 5 wherein said means for releasing and returning the other end of said support means includes:
(a) a winch drum support means mounted with said frame;
(b) winch drum means mounted with said support means; and
(c) winch line means secured at one end with said drum and at the other end with the end of said support means for releasing and returning of the end of said support means relative to said frame as desired.

References Cited
UNITED STATES PATENTS 3,039,626  6/1962  Schreiner et al. ___ 214—6.5 XR

FOREIGN PATENTS 658,431  2/1963  Canada.

ROBERT G. SHERIDAN, Primary Examiner

F. E. WERNER, Assistant Examiner

U.S. Cl. X.R.

214—1